United States Patent
Krogstad

Patent Number: 5,281,979
Date of Patent: Jan. 25, 1994

[54] LASER PRINTER CALIBRATION

[75] Inventor: Robert T. Krogstad, Rochester, N.Y.

[73] Assignee: Eastman Kodak Company, Rochester, N.Y.

[21] Appl. No.: 971,371

[22] Filed: Nov. 4, 1992

[51] Int. Cl.⁵ .............................................. H04N 1/21
[52] U.S. Cl. ...................................... 346/108; 358/298
[58] Field of Search ................... 346/1.1, 108, 76 L, 346/107 R, 160; 358/296, 298, 300, 302; 355/214, 246

[56] References Cited

U.S. PATENT DOCUMENTS

| | | | |
|---|---|---|---|
| 4,075,662 | 2/1978 | Gall | 358/280 |
| 4,268,750 | 5/1981 | Cowart | 358/111 |
| 4,467,364 | 9/1984 | Konagaya | 358/280 |
| 4,534,059 | 9/1985 | Yamada | 382/54 |
| 4,679,095 | 7/1987 | Kitamura et al. | 358/280 |
| 4,727,434 | 2/1988 | Kawamura | 358/280 |
| 4,731,662 | 3/1988 | Udagawa et al. | 358/75 |
| 4,751,523 | 6/1988 | Froelich | 346/108 |
| 4,792,979 | 12/1988 | Nomura et al. | 382/54 |
| 4,802,107 | 1/1989 | Yamamoto et al. | 364/525 |
| 4,816,863 | 3/1989 | Lee | 355/14 |
| 4,839,721 | 6/1989 | Abdulwahab et al. | 358/80 |
| 4,839,722 | 6/1989 | Barry et al. | 358/80 |
| 4,864,392 | 9/1989 | Sato | 358/80 |
| 5,001,512 | 3/1991 | Kubota | 355/38 |
| 5,148,289 | 9/1992 | Nishiyama et al. | 358/300 |

Primary Examiner—Mark J. Reinhart
Attorney, Agent, or Firm—William F. Noval

[57] ABSTRACT

A method of calibrating a laser printer. The method includes the steps of finding the limit and print control system exposure, printing a calibration page and printing a regular page.

4 Claims, 2 Drawing Sheets

LASER PRINTER CALIBRATION

FIELD OF THE INVENTION

This invention relates in general to laser imaging apparatus and this invention relates more particularly to a method for calibrating a continuous tone laser printer. The calibration method has the ability to produce a single calibration page and derive from that page information required to produce calibrated prints over a wide range of densities.

BACKGROUND OF THE INVENTION

Laser printers are widely used to reproduce information or images on photosensitive media such as paper or film. One application for a laser printer is in the medical field to reproduce continuous tone x-ray images on film. Typically, the laser printer is a digital laser printer which converts an array of numerical data into an image. Each element of the image is a number which represents the desired density for one pixel of the image. The image can be derived from a medical imaging modality (MRI, CT, US, PET), a digitized x-ray film, a scanned storage phosphor having a latent x-ray image, or an x-ray image archived in optical or magnetic storage devices.

A laser printer varies light intensity to control exposure and therefore density of the laser print. The objective is to print predictable densities with minimum increments to produce a nearly continuous gray scale over the desired density range. Typically, control is a two stage process. One stage (limit control) sets the maximum exposure and the other (print control) adjusts exposure within that limit. Prints are made with different limit control settings to find the setting for the desired maximum density. A calibration print is then made which has a range of print control settings and the limit setting for desired maximum density. This provides density as a function of print control setting for that limit, making it possible to create a table which will convert desired density to print control setting.

A traditional technique for calibrating a laser printer is as follows:

First, a calibration page is printed with a limit setting to produce the desired maximum density and a full range of print settings. The next step is to determine whether this is the desired limit setting by visually inspecting the printed page. The normal objective is to find the minimum exposure required to print the full range of desired densities. The lower the limit setting, the more nearly continuous the gray scale in the printed film. The process of printing and adjusting the maximum limit setting is repeated until a desired limit setting is determined.

Next, a page is printed with the limit system setting selected and with a subset of print system settings which cover the full range of print settings. The resulting densities of the printed page are then measured and a print setting to density table created for the full range of print settings. An output lookup table that can be used to set exposure to produce the desired density for any digital image value is created using the print setting to density table. Thereafter the laser printer prints pages with this output lookup table to produce the desired densities while the same maximum exposure is appropriate. However, if maximum exposure is changed the calibration process must be repeated.

A problem which arises with this calibration technique is that calibration data is specific to a particular limit control setting. If that setting needs to be changed the entire process of successive prints to find the desired limit control setting for maximum density and calibration must be repeated. Also, if different users want different maximum densities each requires separate calibration. Such repeated calibrations is inefficient, costly and nonproductive.

SUMMARY OF THE INVENTION

According to the present invention there is provided a method for calibrating a laser printer which provides a solution to the problems of known calibration methods. The method of the present invention is advantageous over previous calibration techniques in its ability to produce a single calibration page and derive from that calibration page the information required to produce calibrated prints over a wide range of maximum densities.

According to the present invention a method of calibrating a laser printer that has a range of limit control settings and a range of print control settings comprises the steps of:

setting limit control setting for maximum exposure, measuring the exposure for a subset of print settings, calculating exposure for a full range of print settings with maximum limit control setting, setting print control setting for maximum exposure, measuring exposure for a subset of limit settings, calculating exposure for a full range of limit settings with maximum print control setting, printing a page of photosensitive media with the limit system set for maximum exposure and a subset of print settings which cover the full range of print settings, measuring the resulting densities of the printed page, creating a print setting to density table for a full range of print setting, using the print setting to density table and print setting to exposure table to create an exposure to density table, printing a regular page by setting the limit control to print the desired density with the print system at maximum power, calculating an output lookup table with this limit setting, and printing the page with this output lookup table to produce the desired densities.

DESCRIPTION OF THE PREFERRED EMBODIMENTS

Figure 1:
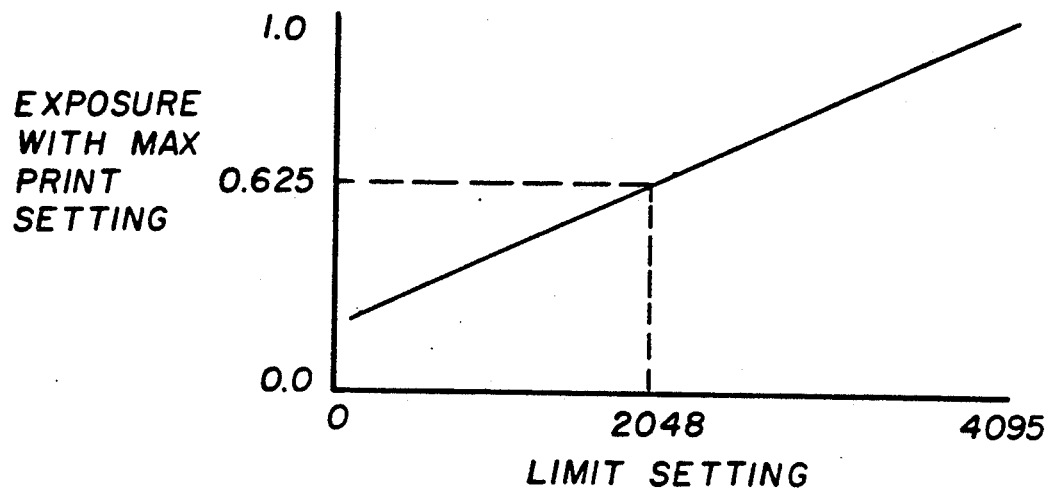
FIG. 1 is a graphical illustration showing exposure with maximum print setting versus range of limit settings.

This invention is applicable to systems with more than one exposure control system. There could be many but they can be partitioned into those that are constant over the duration of an entire print and those that are varied. For this description the control which is constant for an entire print is called the limit control and the control which is varied during a print is called the print control. Obviously, the limit control can be changed between prints. The relative exposure for any combination of the limit and print settings must be able to be calculated. Absolute values are not required, only relative. Consider the example of a single intensity light source with two neutral density attenuators. The performance of each attenuator can be measured independently and their combined transmission is the product of the two.

Two stage control is desirable because the maximum exposure required is not he same for all prints. Different users and materials require different maximum exposure. It is preferable to set the limit system at the lowest possible value. This provides finer control with the print settings. For example, if a system can produce 256 different densities but only 32 of them are within the desired range the result is conspicuous contouring. However if the system can be adjusted so that the entire set of 256 densities is within the desired range, a more nearly continuous tone appearance can be produced.

The traditional process uses a single control system to vary exposure after the system has been calibrated. This requires knowledge of density as a function of setting but does not require knowledge of exposure. The new system of the present invention requires density as a function of relative exposure. The limit and print control systems characteristics may be known or the exposure can be measured.

In either the traditional or new system, a subset of the full set of printable densities is sampled and that sample is used to calculate densities for all settings. Interpolation and curve fitting are two examples of ways to calculate the full set of densities from the measured subset. The new method requires a similar capability for exposure as a function of limit or control setting, if that data is acquired by measurement.

The single print with maximum limit setting must produce the full range of desired densities. This is not the same as the full range of exposures. A minimum exposure is required to produce density different from no exposure. Reducing exposure below that level has no effect. The limit control system does not have this requirement.

The calibration method according to the present invention is as follows:

A. Find limit and print control system exposure.
  1. Set limit system for maximum exposure and measure exposure for a subset of print settings.
  2. Calculate exposure for full range of print settings with maximum limit setting.
  3. Set print system for maximum exposure and measure exposure for a subset of limit settings.
  4. Calculate exposure for full range of limit settings with maximum print setting.
  5. These two tables make it possible to calculate the exposure for any combination of limit and print settings. It is the exposure with both at maximum multiplied by the fraction of full power that each setting provides.

B. Print a calibration page.
  1. Print a page with the limit system set for maximum exposure and a subset of print settings which covers the full range of print settings.
  2. Measure the resulting densities.
  3. Create a print setting to density table for the full range of print settings.
  4. Use the print setting to density table and exposure as a function of print setting to create an exposure to density table.

C. Print a regular page
  1. Set the limit control to print the desired density with the print system at maximum power.
    a) Examine the calibration exposure to density table to find the exposure required to produce the desired maximum density.
    b) Find the limit setting to produce this exposure with the print setting at maximum exposure and set the limit system to this value.
  2. Calculate an output lookup table with this limit setting.
    a) Calculate the exposure for each combination of selected limit setting and print setting.
    b) Use the calibration film exposure to density table to find the density for each combination of selected limit setting and print setting.
    c) Use the print setting to density table to create an output lookup table that can be used to set the exposure to produce the desired density for any digital image value.
  3. Print the page with this output lookup table to produce the desired densities.

The present invention requires a method to determine exposure as a function of limit and print settings. If an exposure control system has known characteristics, no measurements are required. Otherwise, a range of different mixes of curve fitting, interpolation, and relatively sparse or dense measurements can be used. With either the new or the traditional approach density measurements from a subset of print settings are used to find the densities for the full set of print settings. This may use a method similar to that used to expand the measured subset of exposures to the full set. Remeasurement is required when system response changes with either the new or the traditional approach.

The same principle of two stage modulation with one stage constant over the short term set to a level which allows the other to provide control within the region of interest is applicable to any system with two stages, the ability to calculate the output based on the setting for each stage, and knowledge of the desired output. It is not limited to light or printing.

Two possible implementations in the context of a laser printer are:
  1. Modulate the laser directly for limit control and use a transmission (or attenuation) device such as an acousto-optic modulator (AOM) for print control.
  2. Use a variable transmission device such as a pair of rotating polariod filters for limit control and modulate the laser directly for print control.

EXAMPLE

This example uses laser modulation for limit control and an AOM for print control. Each has 12 bit control (4,096 levels).

Figure 2:
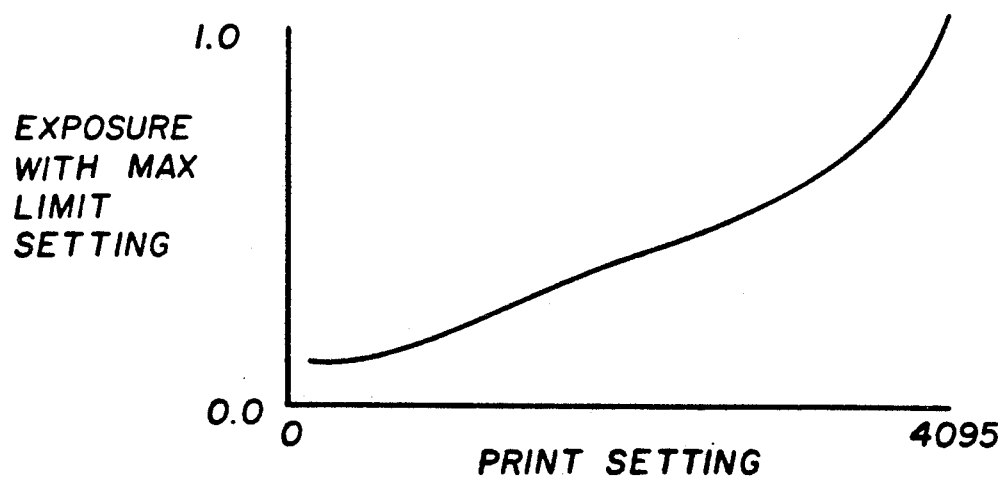
FIG. 2 is a graphical illustration showing exposure with maximum limit setting over a range of print settings.

A. Find limit and print control exposure.
  1. Find laser power (limit control) by measurement or knowledge of system performance. If a subset is measured expand that to the full range of settings by a process such as interpolation or curve fitting. FIG. 1 shows an example of laser power as a function of setting.
  2. Find AOM transmission (print control) by measurement or knowledge of system performance. If a subset is measured expand that to the full range of settings by a process such as interpolation or curve fitting. FIG. 2 shows possible AOM transmission as a function of setting.

B. Print a calibration page.

1. Print a page with the limit system set for maximum exposure and a subset of print settings which covers the full range of print settings.

Figure 3:
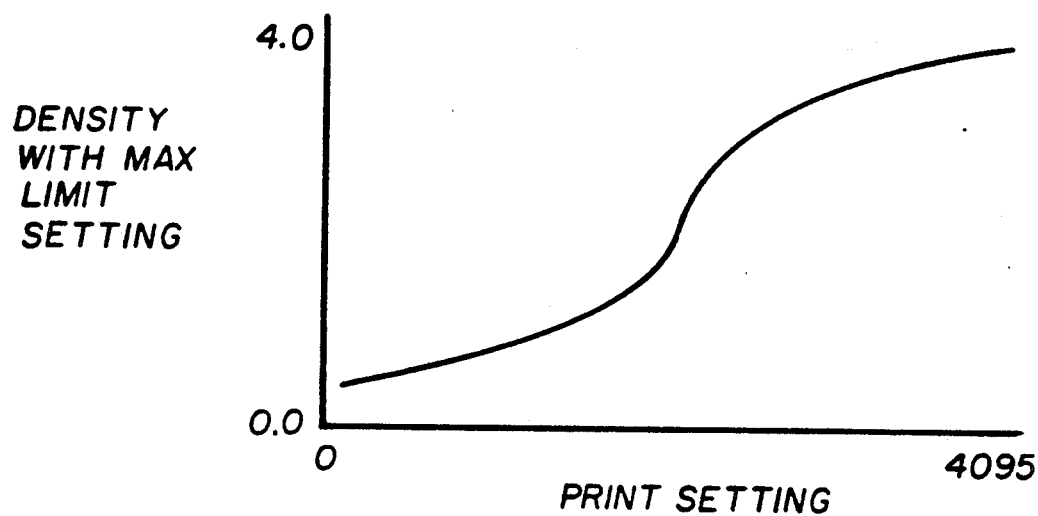
FIG. 3 is a graphical illustration showing measured density with maximum limit settings over a range of print settings.

2. Measure the density produced by the different exposure levels and expand the measured set to the full set by a technique such as interpolation or curve fitting. FIG. 3 shows an example of density as a function of print setting.

Figure 4:
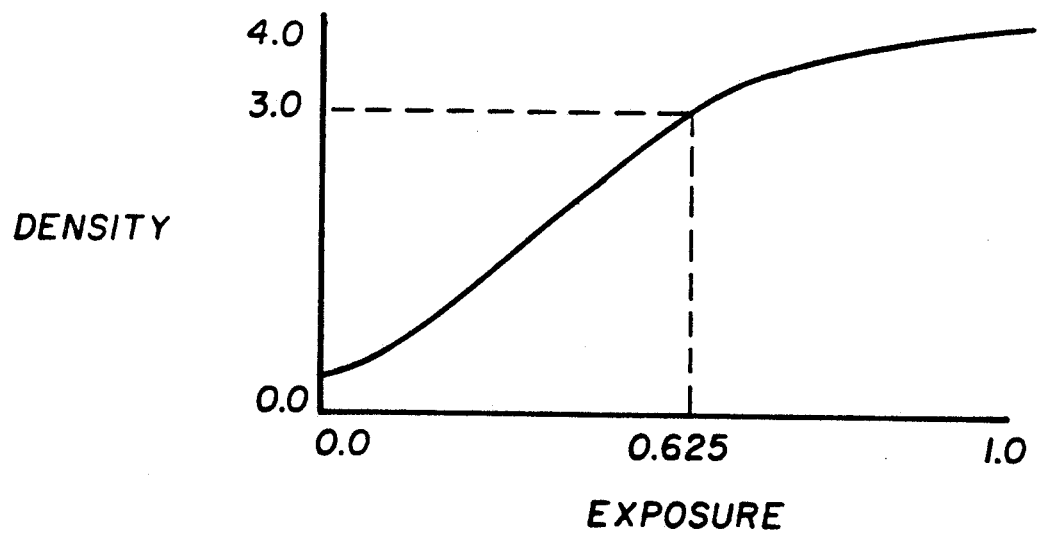
FIG. 4 is a graphical illustration showing density versus exposure.

3. Find density as a function of exposure. This can be accomplished by combining the two existing tables, exposure as a function of print setting and density as a function of print setting. FIG. 4 is an example of density as a function of exposure.

C. Print a regular page.

1. Select limit control setting to print desired density with print control at maximum. In this example that is density 3.0. (FIG. 4)

a) Examine density as a function of exposure (FIG. 4) to find the exposure required to produce density 3.0. In this example that is $\frac{5}{8}$ of maximum exposure.

b) Examine exposure as a function of limit setting (FIG. 1) to find the limit setting which produces $\frac{5}{8}$ of maximum exposure. In this example the limit setting is 2,048.

2. Select code value to density relationship over the printable range. In this example this is linear.

3. Calculate output lookup table.

a) Calculate exposure for each print setting with limit set at 2,048, which is ($\frac{5}{8}$) * calibration film exposure.

b) Find density for each print setting with limit set at 2,048. This can be obtained from the density as a function of exposure data (FIG. 4) which is based on the calibration print. For all exposures below the minimum calibration print exposure, set the density to the density for the calibration print's minimum exposure.

c) For each pixel value find the element in the density as a function of print setting (with limit setting adjusted) which produces the desired density. This is the output lookup table.

Advantages

This invention is a method for calibrating a printer. It's advantage over previous calibration techniques is the ability to produce a single calibration page and derive from that the information required to produce calibrated prints over a wide range of densities.

Although the invention has been described with reference to preferred embodiments thereof, it will be understood that variations and modifications can be effected within the spirit and scope of the invention as described above and as defined in the appended claims.

What is claimed is:

1. A method of calibrating a laser printer that has a range of limit control settings and a range of print control settings comprising:
    setting limit control setting for maximum exposure;
    measuring exposure for a subset of print settings;
    calculating exposure for full range of print settings with maximum limit control setting;
    setting print control setting for maximum exposure;
    measuring exposure for a subset of limit settings;
    calculating exposure for full range of limit settings with maximum print control setting;
    printing a page of photosensitive media with the limit system set for maximum exposure and a subset of print settings which cover the full range of print settings;
    measuring the resulting densities;
    creating a print setting to density table for a full range of print settings; and
    using the print setting to density table and print setting to exposure table creating an exposure to density table.

2. The method of claim 1 including the steps of printing a regular page by setting the limit control to print the desired density with the print system at maximum power;
    calculating an output lookup table with this limit setting; and
    printing the page with this output lookup table to produce the desired densities in the printed page.

3. The method of claim 2 wherein said setting step includes the steps of examining the calibration exposure to density table to find the exposure required to produce the desired maximum density; finding the limit setting to produce this exposure with the print setting at maximum exposure; and setting the limit system to this value.

4. The method of claim 3 wherein said calculating step includes the steps of: calculating the exposure for each combination of selected limit setting and print setting; using the calibration film exposure to density table to find the density for each combination of limit and print settings; and using the print setting to density table to create an output lookup table that can be used to set the exposure to produce the desired density for any digital image value.

* * * * *